(12) United States Patent
Brown

(10) Patent No.: US 8,601,823 B2
(45) Date of Patent: Dec. 10, 2013

(54) SMART WIRELESS ENGINE SENSOR

(75) Inventor: Rork Brown, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 514 days.

(21) Appl. No.: 12/944,022

(22) Filed: Nov. 11, 2010

(65) Prior Publication Data

US 2011/0056214 A1 Mar. 10, 2011

Related U.S. Application Data

(62) Division of application No. 11/585,475, filed on Oct. 24, 2006, now Pat. No. 7,854,127.

(51) Int. Cl.
*F02C 6/00* (2006.01)

(52) U.S. Cl.
USPC .............................. 60/803; 340/945

(58) Field of Classification Search
USPC ................ 60/226.1, 803; 340/945, 963, 971; 701/3, 9, 14; 415/118
See application file for complete search history.

(56) References Cited

U.S. PATENT DOCUMENTS

| | | | |
|---|---|---|---|
| 4,116,000 A | | 9/1978 | Martin et al. |
| 7,479,876 B2 * | | 1/2009 | Carle et al. ............... 340/539.17 |
| 2004/0199640 A1 * | | 10/2004 | Williams et al. ............. 709/227 |
| 2005/0017876 A1 | | 1/2005 | Ziarno |
| 2005/0171651 A1 | | 8/2005 | Loda et al. |
| 2006/0137627 A1 | | 6/2006 | Kim et al. |
| 2006/0168090 A1 | | 7/2006 | Loda et al. |
| 2006/0186875 A1 | | 8/2006 | Schroeder et al. |
| 2006/0230833 A1 | | 10/2006 | Liu et al. |
| 2006/0238332 A1 | | 10/2006 | Carle et al. |
| 2006/0241845 A1 | | 10/2006 | Loda et al. |
| 2006/0254986 A1 | | 11/2006 | Hanson et al. |
| 2007/0030134 A1 | | 2/2007 | Liu et al. |
| 2007/0139193 A1 * | | 6/2007 | Arik et al. ............... 340/539.26 |

FOREIGN PATENT DOCUMENTS

| | | |
|---|---|---|
| JP | 9062305 | 3/1997 |
| JP | 2002006941 | 1/2002 |
| JP | 2006-170189 | 6/2006 |
| JP | 2006-215693 | 8/2006 |
| WO | 2005/096571 | 10/2005 |

OTHER PUBLICATIONS

Extended European Search Report dated Sep. 3, 2008.

* cited by examiner

*Primary Examiner* — Phutthiwat Wongwian
(74) *Attorney, Agent, or Firm* — Carlson, Gaskey & Olds, P.C.

(57) ABSTRACT

Sensors are mounted to an engine to detect engine conditions and send information to an engine controller or other engine component through a wireless connection. Ports are located on the engine controller. An antenna assembly is plugged into one of the ports and wirelessly receives the signal from the sensor. Another antenna assembly transmits a signal from the engine controller to an external component. A processor within the antenna assemblies monitors and adjusts the signals to correct for signal interference.

14 Claims, 3 Drawing Sheets

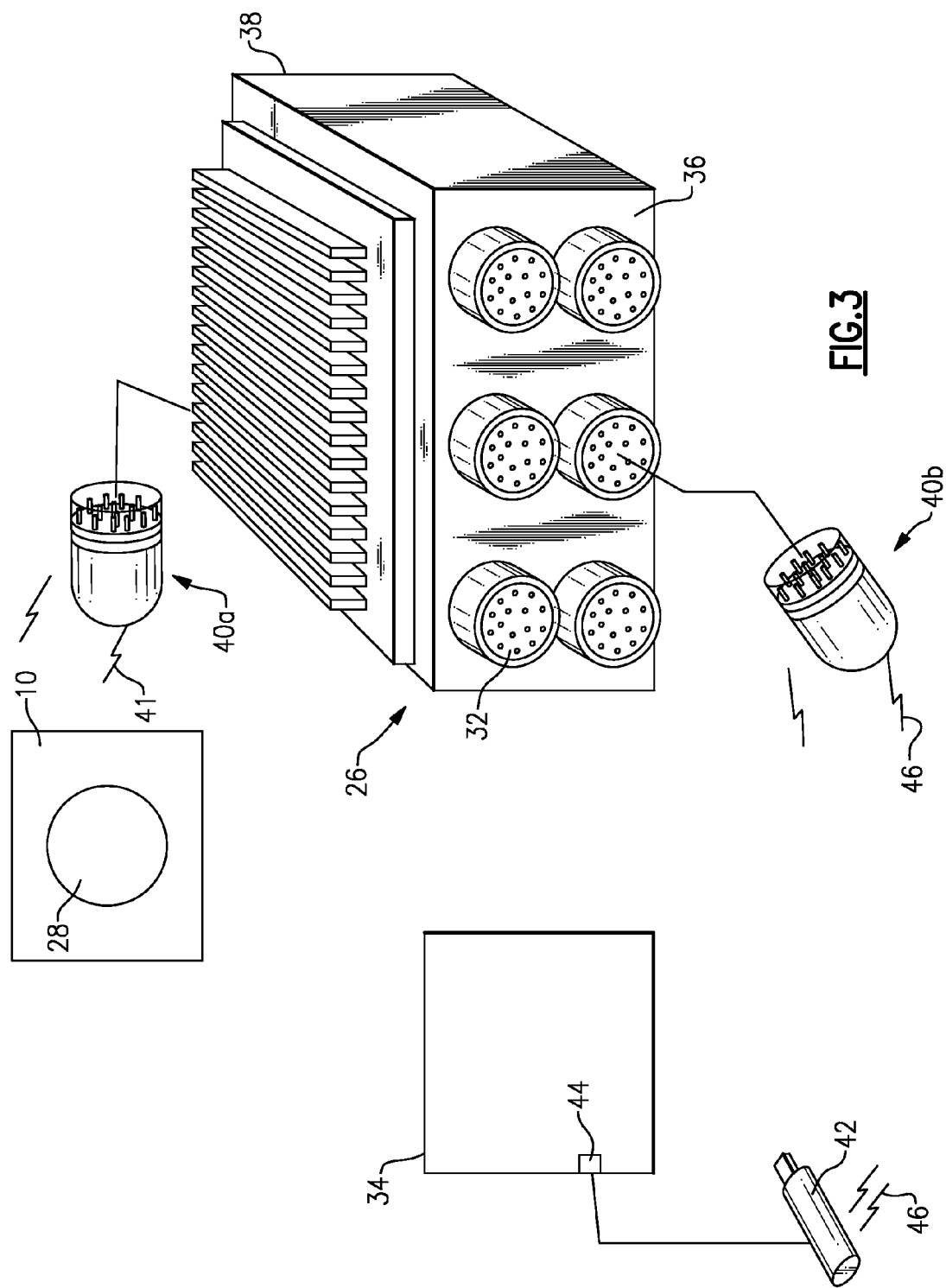

SMART WIRELESS ENGINE SENSOR

REFERENCE TO RELATED APPLICATION

This application is a divisional application of U.S. patent application Ser. No. 11/585,475, filed on Oct. 24, 2006 now U.S. Pat. No. 7,854,127.

BACKGROUND OF THE INVENTION

This invention relates to a smart wireless engine sensor for wirelessly transmitting/receiving data to and from an engine controller.

Engine sensors are commonly used to collect data during engine operation. Sensors transmit information about a turbine engine, for example, to an engine controller. The engine controller is mounted to the engine and has a wired connection with the sensors. Additionally, the engine controller includes ports for connecting cabling between the engine controller and a desired external component that receives the sensor data. The engine controller communicates the sensor data to the external component to monitor engine conditions, such as for engine maintenance information.

The wiring and cabling that connects the sensor to the external component is an additional weight on the turbine engine and also increases the space required for the engine controller and the sensors. Additionally, if any failures in the wiring and cabling occur, the system incorrectly indicates a failure of the engine component that is being monitored.

Accordingly, it is desirable to provide a wireless engine sensor that communicates sensor information while limiting improper failure signals and that has a lighter arrangement.

SUMMARY OF THE INVENTION

A wireless engine sensor according to the present invention wirelessly communicates data between a sensor and an external component.

An engine controller is mounted to a turbine engine, and data collected from engine sensors is sent to the engine controller. Ports are located on the engine controller for receiving antenna assemblies. One antenna assembly received in a sensor port of the engine controller receives/transmits information to and from the sensors. Another antenna assembly received in a component port of the engine controller receives/transmits information to and from an external component.

The antenna assemblies each include a connector, a processor, supporting electronics and an antenna. The processor is a multicore processor board to monitor the signal between the antenna and the sensor or the external component and to adjust the signal to correct for signal interference. The antenna includes a transmitter and a receiver module to transmit and receive the signal. A radome covers the antenna and the processor to protect the components from external contamination.

These and other features of the present invention can be best understood from the following specification and drawings, the following of which is a brief description.

BRIEF DESCRIPTION OF THE DRAWINGS

FIG. 3 illustrates the example engine controller; and

DETAILED DESCRIPTION OF THE PREFERRED EMBODIMENT

Figure 1:
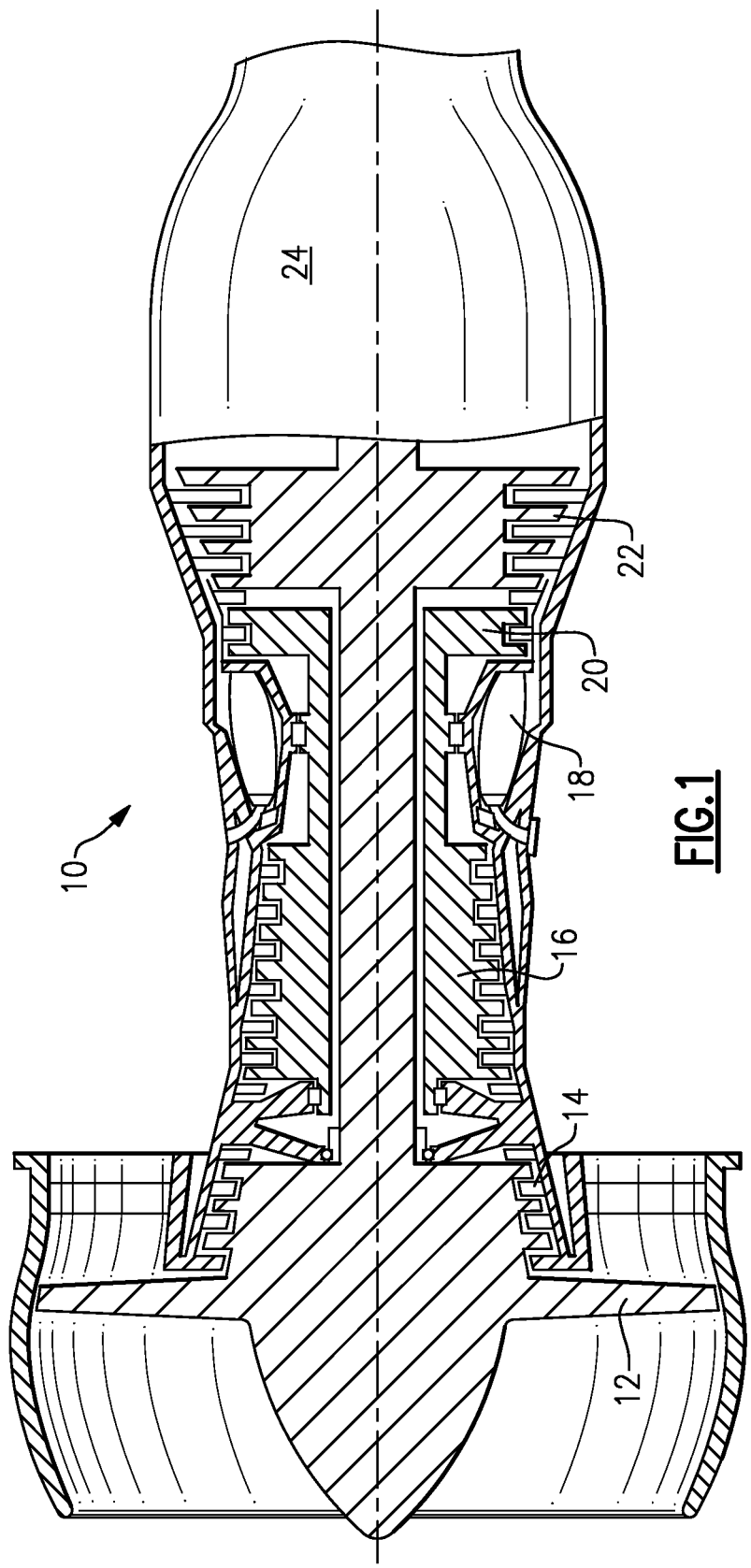
FIG. 1 is a schematic view of an example turbine engine of the present invention.

FIG. 1 is a schematic view of a turbine engine 10. Air is pulled into the turbine engine 10 by a fan 12 and flows through a low pressure compressor 14 and a high pressure compressor 16. Fuel is mixed with the air, and combustion occurs within the combustor 18. Exhaust from combustion flows through a high pressure turbine 20 and a low pressure turbine 22 prior to leaving the engine 10 through an exhaust nozzle 24.

Figure 2:
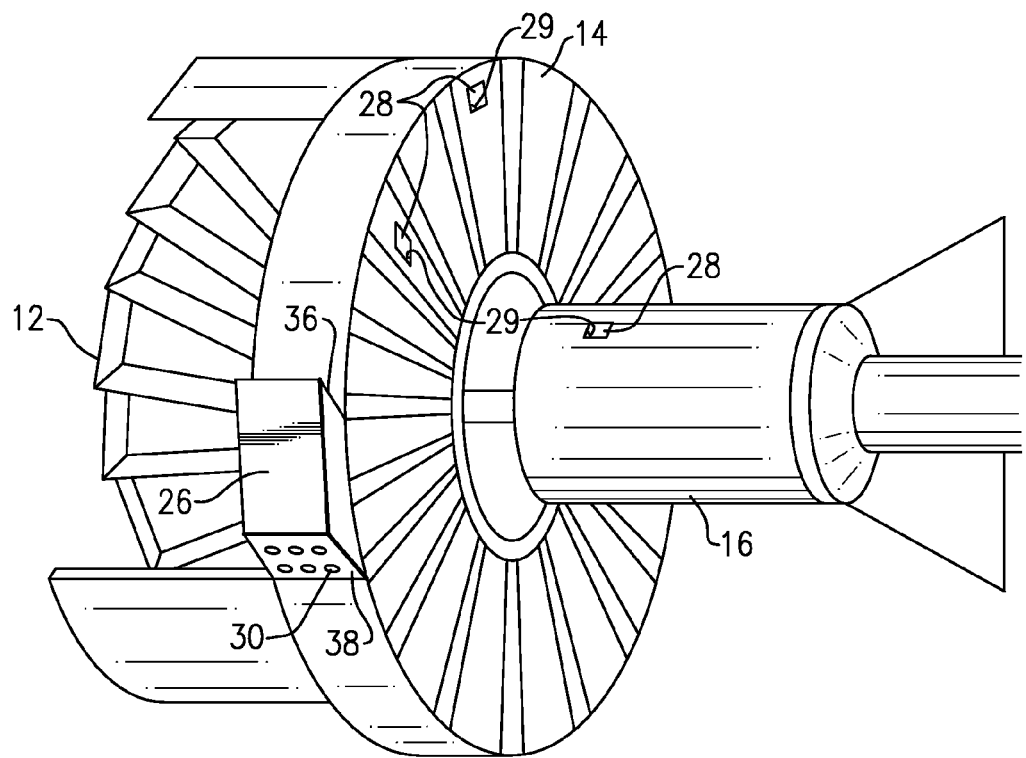
FIG. 2 is an enlarged view of a portion of the engine showing an example engine controller.

FIG. 2 illustrates an enlarged view of a portion of the engine 10. An engine controller 26 is mounted on or near the engine 10. The engine controller 26 is preferably a full authority digital engine controller as is commonly used with turbine engines 10. In the example shown, the engine controller 26 is mounted to the low pressure compressor 14. However, the engine controller 26 can be mounted to any location on or adjacent to the engine 10 that is convenient. Sensors 28 are mounted to the turbine engine 10 to sense engine information, such as temperature or pressure at the location of the sensor 28. Each sensor 28 is programmable. A transmitter/receiver 29 in the sensor 28 wirelessly transmits the data collected to and from the engine controller 26. The sensors 28 may also be located at other location on an aircraft that houses the turbine engine 10, such as in the landing gear.

FIG. 3 illustrates an example engine controller 26 including sensor ports 30 (shown in FIG. 2) and component ports 32. In one example, the engine controller 26 is a full authority digital engine controller (FADEC). The sensor ports 30 receive an antenna assembly 40a to wireless connect the engine controller 26 to the sensors 28. The component ports 32 receive an antenna assembly 40b to wirelessly connect the engine controller 26 to an external component 34. The external component 34 may be a computer, further engine control unit, or data processor. The external component 34 may further be connected to a system network or another device on-board or off-board an aircraft.

The component ports 32 are located on a first side 36 of the engine controller 26, which is oriented within the engine 10 for easy access. The sensor ports 30 are located on a second side 38 of the engine controller 26 and can also be accessed by a user. The sensor ports 30 and the component ports 32 are designed to receive a connector 48 including pins 43, such as a pin connector styled plug that is typically provided at the end of cables.

The antenna assemblies 40a are plugged into the sensor ports 30, and the other antenna assemblies 40b are plugged into the component ports 32. The sensor 28 wirelessly transmits and receives signals 41 to and from the antenna assembly 40a plugged into the sensor port 30. The antenna assembly 40b wirelessly transmits and receives signals 46 to and from the external component 34.

The external component 34 includes a serial bus 44, and a wireless universal serial bus adapter 42 may plug into the serial bus 44. The adapter 42 communicates the signal 46 to and from the antenna assembly 40b that is plugged into the component port 32. Thus, the antenna assembly 40b can be used with any external component 34 having a serial bus 44. The signal 46 can be transmitted at a frequency in the infrared to the microwave band. Alternately, a wireless transceiver and receiver could be designed in the external component 34 such that the adapter 42 would not be necessary. The external component 34 could be located on the aircraft driven by the turbine engine 10, or may be located at a remote location, such as a tarmac proximate to the turbine engine 10.

Figure 4:
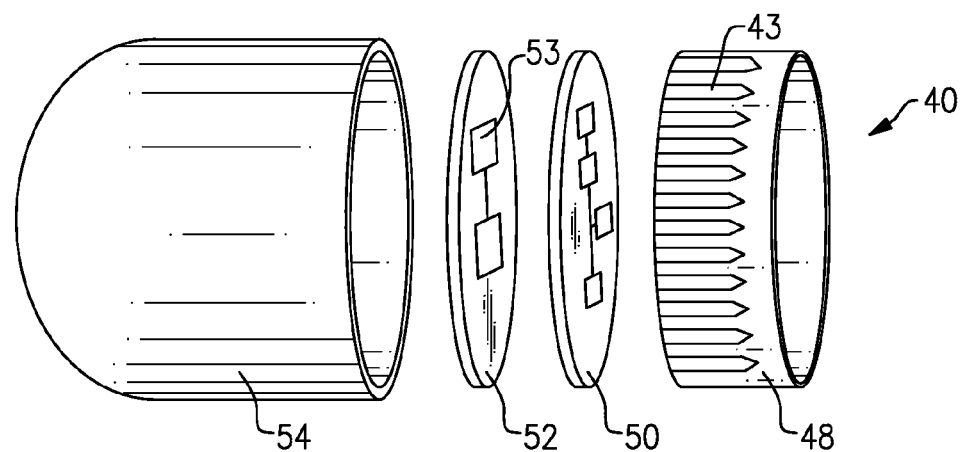
FIG. 4 is an exploded view of an example antenna assembly of the present invention.

FIG. 4 illustrates an exploded view of an example antenna assembly 40. The antenna assembly 40 includes the connector 48, a processor 50 and an antenna 52. A radome 54 covers the antenna 52 and the processor 50 to protect the components from external contamination. The connector 48 is a pin style connector including pins 43, similar to that found at the end of cables, and fits within the sensor ports 30 and the component ports 32 of the engine controller 26 (shown in FIG. 3). The connector 48 can be any style designed to fit existing connections on the engine controller 26. The antenna 52 includes a transmitter and a receiver module 53 to transmit and receive the signals 41 and 46 to and from the sensor 28 and the external component 34, respectively.

The processor 50 is preferably a multicore processor board. The processor 50 allows the antenna 52 to transmit a signal 41 and 46 at a frequency in the infrared to microwave band. The processor 50 can be programmed to monitor the signal 46 between the antenna 52 and the external component 34 for the antenna assembly 40b or to monitor the signal 41 between the antenna 52 and the sensor 28 for the antenna assembly 40a. If an undue amount of signal interference is detected, the processor 50 can adjust the signals 41 or 46 to temporarily correct any issues. Thus, the processor 50 can provide adjustments during operation of the engine 10 to maintain communications until maintenance or repair can occur. If needed, the processor 50 can be reprogrammed with updated information. The processor 50 can also amplify the signals 41 or 46 or adjust the signal frequency.

In addition, the processor 50 may also analyze data from the sensor 28 as it is transferred to the antenna 52. Data analysis by the processor 50, for example, can include prediction of component life or failure for the portion of the turbine engine 10 being monitored by the sensor 28. Information from multiple sensors 28 may be transferred from the controller 26 to the external component 34 with the signal 46 for analysis.

Each antenna assembly 40a and 40b may contain prognostic algorithms and/or testing software to evaluate the operation condition of the attached equipment. Each antenna assembly 40a and 40b may also report equipment malfunction, especially when the aircraft is on the ground and the cowling is open. The antenna assemblies 40a and 40b also can communicate to a ground device. The antenna assemblies 40a and 40b also allow for correction and emergency correction of the attached equipment, if necessary, while the aircraft is in flight. By employing antenna assemblies 40a and 40b, a neural network or a distributed computational network that communicates data wirelessly is possible. Each antenna assembly 40a and 40b can also communicate with more than one engine controller 26 or engine component or be assigned a hierarchy of communication.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a sensor mounted to the turbine engine to sense engine conditions;
   an engine controller;
   an external component; and
   an antenna assembly including a sensor antenna and a component antenna,
   wherein the sensor antenna and the component antenna are mounted to the engine controller, the sensor communicates information to the sensor antenna by wireless transmission, and the engine controller communicates the information to the external component by wireless transmission using the component antenna.

2. The turbine engine of claim 1, wherein the sensor antenna comprises a sensor processor and the component antenna comprises a component processor to analyze data from the sensor.

3. The turbine engine of claim 1, wherein the external component comprises a computer.

4. The turbine engine of claim 1, comprising a sensor radome covering the sensor antenna and a component radome covering the component antenna.

5. The turbine engine of claim 1, wherein the engine controller is a full authority digital engine controller mounted to the turbine engine.

6. The turbine engine of claim 1, wherein the sensor and the engine component are separate components.

7. The turbine engine of claim 1, wherein the engine controller is mounted on the turbine engine.

8. The turbine engine of claim 1, wherein the engine controller is mounted on the turbine engine, and the external component is a computer.

9. The turbine engine of claim 1, wherein the turbine engine is a gas turbine engine.

10. The turbine engine of claim 1, including a compressor, a combustor, and a turbine.

11. The turbine engine of claim 1, wherein the sensor antenna includes one of a port and a detachable pin connector, the engine controller includes the other of the port and the detachable pin connector, and the detachable pin connector is received in the port.

12. The turbine engine of claim 1, wherein the component antenna includes one of a port and a detachable pin connector, the engine controller includes the other of the port and the detachable pin connector, and the detachable pin connector is received in the port.

13. The turbine engine of claim 1, wherein at least one of the sensor antenna and the component antenna includes one of a port and a detachable pin connector, the engine controller includes the other of the port and the detachable pin connector, and the detachable pin connector is received in the port.

14. A turbine engine comprising:
   a fan;
   a compressor;
   a combustor;
   a turbine; and
   a sensor mounted to the turbine engine;
   an engine controller;
   a sensor antenna connected to the engine controller, wherein the sensor communicates information to the sensor antenna by wireless transmission;
   a sensor pin connector for mounting the sensor antenna to a sensor port on the engine controller; and
   a component pin connector for mounting the component antenna to a component port on the engine controller.

* * * * *